(12) United States Patent  
Apperson

(10) Patent No.: US 6,695,216 B2
(45) Date of Patent: *Feb. 24, 2004

(54) DATA PROCESSING FORM FOR USE WITH A SCANNING APPARATUS

(76) Inventor: William Apperson, 23311 194$^{th}$ Ave. SE., Renton, WA (US) 98058

( * ) Notice: Subject to any disclaimer, the term of this patent is extended or adjusted under 35 U.S.C. 154(b) by 0 days.

This patent is subject to a terminal disclaimer.

(21) Appl. No.: 09/801,075
(22) Filed: Mar. 8, 2001
(65) Prior Publication Data
US 2002/0134845 A1 Sep. 26, 2002
(51) Int. Cl.$^7$ .................................................. G06K 1/06
(52) U.S. Cl. ...................... 235/494; 235/475; 235/482; 235/460
(58) Field of Search ................................ 235/494, 475, 235/482, 460

(56) References Cited

U.S. PATENT DOCUMENTS

| | | | | |
|---|---|---|---|---|
| 3,800,439 A | * | 4/1974 | Sokolski et al. | 434/355 |
| 3,900,961 A | * | 8/1975 | Sokolski et al. | 434/363 |
| 5,001,330 A | * | 3/1991 | Koch | 235/436 |
| 5,085,587 A | * | 2/1992 | DesForges et al. | 434/355 |
| 5,121,446 A | * | 6/1992 | Yamada et al. | 382/252 |
| 5,184,003 A | * | 2/1993 | McMillin et al. | 235/454 |
| 6,099,102 A | * | 8/2000 | Tanaka et al. | 347/9 |

* cited by examiner

Primary Examiner—Michael G. Lee
Assistant Examiner—Kimberly Nguyen
(74) Attorney, Agent, or Firm—G. Donald Weber, Jr.

(57) ABSTRACT

This invention is directed to a unique type of form to be used with an optical mark sensing device known as a mark read scanner for reading marks on the form. Form characteristics are defined by "graphic switches" printed near the lead edge of the form. Each "graphic switch" has four distinct settings. The expense of completely replacing the internal program of a scanner when a user requests a variation of a test form that had not been pre-programmed into the original specification of the scanner is eliminated.

16 Claims, 2 Drawing Sheets

DATA PROCESSING FORM FOR USE WITH A SCANNING APPARATUS

BACKGROUND

1. Field of the Invention

This invention relates to a form for use with an optical mark sensing device, in general, and to a form which has specifically designed graphic switches on the forms, in particular.

2. Prior Art

Mark read scanners are used in a variety of data collection applications. The forms used with mark read scanners are commonly referred to as "bubble" or optical mark read (OMR) forms on which the user fills in a bubble (or space) on the form, typically, with a number 2 lead pencil.

Most known mark sensory and scoring devices and mark interpretation software use a binary system for describing the absence or presence of a mark. These systems are limited to the presence/absence or on/off binary sequence. Thus, very large numbers of codes are needed in order to read a relatively large number of marks. Mark positions on forms known in the art are, typically, assigned digital values between "0" and "255" at the start of the process. These values are often refined to 16 levels and, finally, discriminated in a binary format where "1" represents a mark and "0" represents no mark.

Most known forms use markings, colloquially known as "skunk marks" on the leading edge of the form or scan document. Skunk marks are preprinted, form-identifying, black marks which must match a mark pattern pre-programmed into the software of the scanner. If the skunk mark pattern for a form, typically a newly designed form, has not been programmed into these devices, the scanner will reject the form as unrecognizable.

There are several stand-alone test-scoring devices known in the art. Frequently, such devices are used within the education industry. These devices usually have been designed with limited versatility and do not easily operate on other test forms which are compatible, for example in size and shape, with the mode of operation thereof. This lack of versatility is a significant inconvenience to the user who wishes to use a form which is not included in the specific "family" of forms that has been "pre-programmed" or designed to operate with the existing scanner.

One known scanner, in the form of a scoring device, does not use form-identifying marks on the leading edge of the document. Rather, the form for this device employs black rectangular "start" and "stop" marks which are printed in line with timing marks on the document. The start mark is at the leading edge of the timing marks and the stop mark is at the trailing edge of the timing marks. These marks signal the scanner device to begin sensing for timing marks and then to stop sensing for timing marks, respectively. Other than the black rectangular start and stop marks, there are no other pre-printed marks on the document that convey document attributes to the scanner software for processing flow.

In another scanner system, the forms incorporated more advanced ternary-type graphic switches with three separate and distinct characteristics or variations in a gray scale. This form is an excellent form but is somewhat limited in the number of distinct forms which can be identified by the three-level graphic switches. This limited number of distinct forms allowed is particularly a problem when due to size and cost constraints the form can only have a limited number of graphic switches available.

It has been determined that there is a need in the education marketplace, where there is a wide variety of state mandated objective type testing, for a stand-alone test scoring device which allows for a large family of test answer sheets that have been pre-programmed to operate within the device. The market also dictates that this device must be economical which forces cost limitations on the number of graphic switch settings that can be interpreted by the device. A solution to increase the number of pre-programmed forms with limited graphic switch positions is necessary. Thus, the instant invention was developed to improve on the prior art system.

PRIOR ART STATEMENT

Reference is made to the following patents which are related to document/form scanning devices.

U.S. Pat. No. 3,800,439; TEST SCORING APPARATUS; Skoloski et al. This patent is directed to an apparatus and form which includes a "start of test mark" and an "end of page mark."

U.S. Pat. No. 3,900,961 TEST SCORING APPARATUS; Skoloski et al. This patent is a division of U.S. Pat. No. 3,800,439.

U.S. Pat. No. 5,001,330; OPTICALLY SCANNED DOCUMENT WITH FAIL-SAFE MARKING; Koch. This patent is directed to a form with a first control mark on one surface and a fail-safe mark on the reverse surface of the form.

U.S. Pat. No. 5,085,587; SCANNABLE FORM AND SYSTEM; DesForges et al. This patent is directed to a form and system which includes response control marks for controlling the input of numeric values and other mode selector media.

U.S. Pat. No. 5,184,003; SCANNABLE FORM HAVING A CONTROL MARK COLUMN WITH ENCODED DATA MARKS; McMillan et al. This patent is directed to a form with a timing track which includes pre-encoded date information.

U.S. Pat. No. 6,079,624; DATA PROCESSING FORM USING A SCANNING APPARATUS; Apperson et al. This patent is directed to a system using a form with three level graphic switches.

Other prior art patents relating to scannable forms and scanning apparatus are extant. This listing is not intended to be considered exhaustive.

SUMMARY OF THE INSTANT INVENTION

This invention is directed to a scannable form for use with a scanner device. Graphic switches are printed on the leading edge of the form to define the characteristics of a test form. The form includes graphic switches referred to quad switches which can represent at least four (4) different characteristics or positions. The switches use only black and white designations which are readily ascertainable by the scanner. Thus, the invention allows for a binary or quadruple interpretation of marks. The quadruple (also referred to as "four-fold" or "four-way") interpretation discriminates at least 4 levels or positions of marks and, individually and in combination, assigns values 0, 1, 2 or 3, respectively.

One significant purpose of this form is to grade student test forms in a classroom or school environment. Another purpose is to read ballot forms for elections or the like. Yet another purpose is to read forms designed for survey tabulation. The specific use of quad graphic switches, as opposed to skunk marks, adds versatility to the test-scoring device and allows the scanner to accept a multitude of test answer sheets without the costly expense of reprogramming the EPROM stored within the device.

DESCRIPTION OF A PREFERRED EMBODIMENTS

Figure 1:
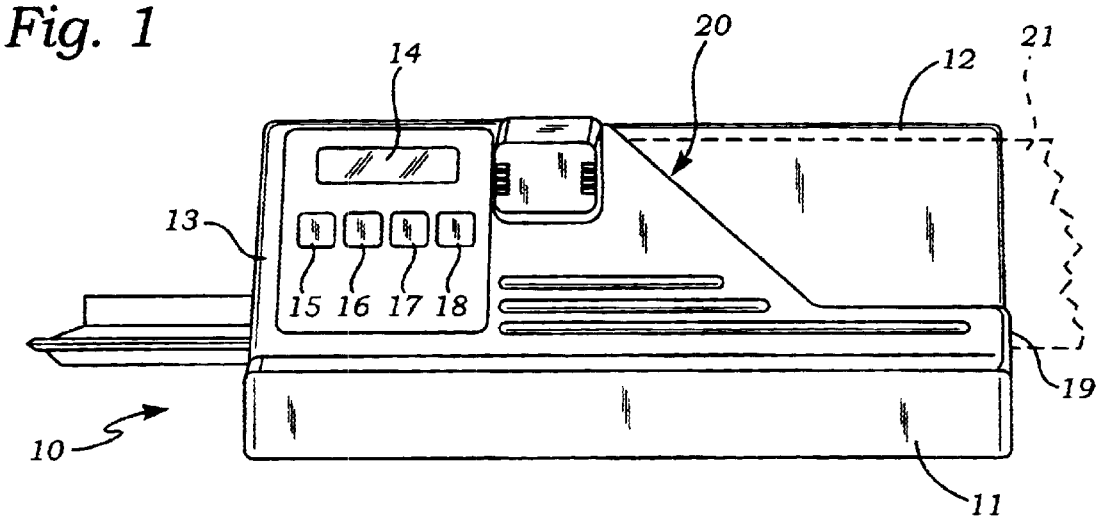
FIG. 1 is a front perspective view of a representative scanner used with the instant invention.

Referring now to FIG. 1, there is shown a front, perspective view of one type of scanner 10 which can read the forms of the instant invention. The scanner 10, which is typical only is described only as representative and is not limitative of the invention. Any suitable scanner can be utilized. The illustrative scanner includes a base 11, a back support 12 and a housing 13. The back support 12 is used, inter alia, to support a form or document 21 (shown dashed) which is to be scanned by the system.

A channel 19 is formed between the base 11 and the back support 12 to receive an edge of the form 21. A slot 20 is formed between the back support 12 and the housing 13 so that the form 21 can be passed therethrough adjacent to the scanning mechanism described hereinafter. A display 14 of any suitable type, such as light emitting diodes (LED's) or the like is used to provide information to the user, as described hereinafter. In addition, the control buttons 15, 16 and 17 are used to cause the scanner to display totals, for example, count totals on a form; request the next display and key a reset function, respectively. A control switch 18 is provided to turn the machine ON or OFF, as desired. Typically, the scanner 10 is connected to a conventional power source. However, battery operation is contemplated.

When the switch 18 is placed in the ON position, the scanner is activated. In a typical operation, the display 14 will indicate a status indication or the like. For example, a READY signal can be displayed. Thereafter, forms 21 are sent through the system by insertion into channel 19 and movement into slot 20.

In a preferred operation, when the form 21 is inserted in to the system the circuitry is activated—typically by detecting the presence of a form—so that the form is then fed through the reading apparatus within housing 13. In the typical start up operation, a KEY form (or master form) is first passed through the scanner 10. The system is, thereby, set to a prescribed operating characteristic as defined by the coding on the KEY card 21.

At this time, the display 14 provides an appropriate designator such as ENTER or the like which indicates that the circuitry has been established for reading subsequent forms (e.g. test forms) similar to form 21 which are to be fed through the system for scanning and reading in accordance with the protocol established by the KEY card.

Thereafter, the test forms (or ballots or analysis forms) to be read (or scanned) are passed through the scanner 10 in the same fashion, whereupon the circuitry in the scanner interprets the coding on the test forms. The scanner 10 provides an output at display 14 which indicates any pre-established information, such as the number (and, thus, the identification); the information to be tabulated, (e.g. the number of right and/or wrong answers on the form); the percentage right and/or wrong answers (as desired); and the output of the ballot which has been scanned. Of course, any other appropriate sensing and reading can be established.

Although not visible in FIG. 1, an outlet port can be provided in the base 11, for example, at the rear of the unit 10. This port can be connected to an external operating system or the like, if desired. Thus, other more sophisticated operations can be controlled by the scanner 10.

Figure 2:
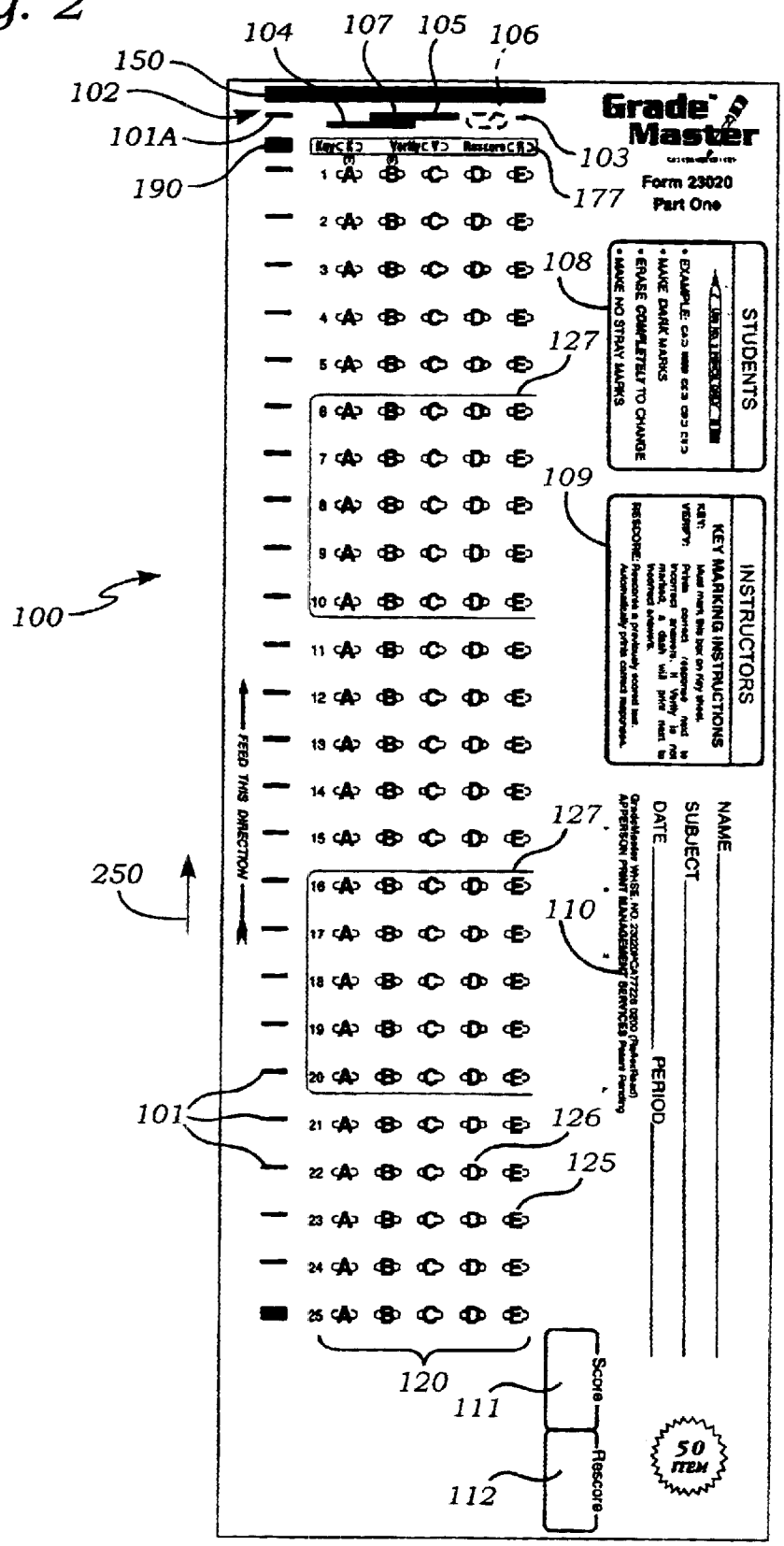
FIG. 2 is a representation of a scannable form according to the instant invention.

Referring now to FIG. 2, there is shown a representative scannable form 100 which forms the instant invention and can be scanned by any suitable scanner device. The basic configuration of the form 100 is similar to forms known and described in the prior art and, as well, generally known in the industry. The form 100, typically, is fabricated of paper or any suitable stock which is capable of receiving the information and being processed by a scanner. The form 100 can be in a vertical configuration (as shown in FIG. 2) or in a horizontal configuration, if so desired. However, the form is arranged to pass through the scanner 10 of FIG. 1 in the direction of the arrow 250 shown adjacent to the form 100.

The markings on the form include the timing marks 101 which are, in a preferred embodiment, disposed along one edge of the form. Typically, this edge becomes the bottom of the form as it is passed through a processing system such as, but not limited to, the scanner 10. The timing marks 101 are suitable and appropriate indicia which are read by the scanner and cause operation thereof.

In a typical case, the timing marks 101 are equally spaced from each other. The number of timing marks is determined by the type of form 100 which is being utilized and the controlling processes or software used in the system. Forms which are known in the art include 25 timing marks, 50 timing marks or any other suitable number. It is also understood that the timing marks are associated with an equal number of rows of "bubbles" or marking areas of a conventional nature. Thus, 25 timing marks are used with 25 rows of bubbles, and so forth.

As shown in FIG. 2, the marking areas are, generally, rectangular blocks with encoded indicia such as alpha or numeric symbols associated therewith. These marking areas are arranged in horizontal rows and vertical columns, as is conventional.

In addition, the form layout or format may include one or more testing columns 120 which are arranged parallel to the edge of the form 100. Each of the testing columns may include a plurality of marking rows, as shown, for example, by rows 125, 126 and the like which are arranged substantially perpendicular to the edge of the form 100. Moreover, it is contemplated that the rows and columns can be divided into "fields" for ease in using the forms. The fields, for example represented by the end lines 127, typically, are not significant to the operation of the scanner 10 or the form 100 of this invention, per se.

The form 100 may also include other conventional information such as an instruction box 108 for the user and an instruction box 109 for the instructor or other individual who is controlling the use of the form. A typical block 110 can be arranged to include any other suitable information, such as address, subject matter, class period, date or the like.

A rather conventional keyline 177 includes one or more response bubbles which are marked to designate a KEY form. For example, a test administrator can insert marks which flag the particular form as the instructor's KEY form which is used to set the "correct" responses of the scanner system. A score box 111 and a re-score box 112 are provided on the form. These blocks are conventional in other scanning systems. Such boxes may be used or not, as desired.

The large block 190 aligned with the keyline 177 is, in essence, a "start" mark which indicates to the scanner to begin interpreting user inserted markings on the document.

Next in sequence after the leader block 150 is the header area 102. The header area 102 includes a plurality of locations which are aligned with the individual marking columns on the form. In addition, these locations are aligned with the individual scanner elements in the scanner mechanism 10, as described infra.

In this invention, the header area 102 includes a first timing mark 101A which is used to initiate the sensing of the quad graphic switch settings. The timing mark 101A is aligned with the other timing marks 101 adjacent the front edge of the form 100. Another location in the header area 102, typically at or near the opposite edge of the form, is a skew detector block 103. In this system, if the leader block 150 or timing mark 101A and skew detector block 103 are not detected by the scanning system within a specified time tolerance, it is assumed that the form 100 is improperly placed in the scanner, e.g. the form may be skewed whereupon the scanning interpretation of the information on the form 100 is rejected as erroneous. Typically, the form 100 is merely re-inserted into the scanner 10 in the appropriate alignment and the system operates properly.

In a preferred embodiment of the form of the instant invention, the header area 102 includes a plurality of graphic switches 104–107 which are aligned with the several scanner elements in the scanner device 10. The switches 104–107, in this invention, are arranged to operate in a quadruple or four-way indication system. That is, the switches define an area or block of space on the form 100. However, each of the switches or blocks 104–107 can selectively be defined as having a pre-set configuration. For example, a switch can be an upper block sector, a lower block sector, an upper and lower block sector which is black or white. For example, as shown in FIG. 2, block 104 is shown as a lower block sector; block 105 is shown as an upper block sector; block 107 is shown as an upper and lower block sector (all of which are shown in black) and block 106 (represented by the dashed outlines) is shown as white (or blank).

In this embodiment, graphic switches 104–107 are rectangular marks which are represented in the quadruple or four-level format on documents as a narrow upper black mark; a narrow lower black mark; a combined upper and lower black mark and a blank or white mark (i.e. neither upper nor lower black mark). These switches convey important specifications and information about the document—which information determines how the software and hardware of the scanner will perform when processing the document. The graphic switches 104–107 are interpreted by the software in the scanner device 10 as individual switches or as groups of switches. Of course, consideration of groups of four or more switches may be contemplated.

These groups represent specific attributes and/or characteristics of the document. For example, the graphic switch groups provide information about the forms, such as form type (tests, ballots, surveys, item analysis sheets or diagnostic forms) and side of document (front or back); character printing (alpha, numeric or no printing). By representing these groupings with four level based switches the number of combinations is increased. For example, using a group of three such four level switches allows for a combination of up to 64 types of forms. A binary interpretation would reduce this grouping to 9 types of forms. This method of increasing the number of combinations using a limited number of switches, for example from 9 to 64, avoids the need for additional costly sensors or other less desirable schemes for achieving greater number of combinations.

Each of these areas or blocks in the header 102 is sensed by the scanner sensors when the form 100 is passed into or through the scanner 10. The scanner is operative to interpret the graphic switch settings. With this arrangement, the header blocks (graphic switches 104–107) identify various operational functions for the system. Importantly, each of these switches has four separate and distinct characteristics defined by the arrangement and combination of black and white sectors, as noted.

Figure 3:
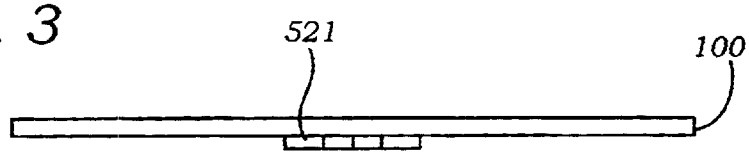
FIG. 3 is a schematic representation of a sensor utilized in this invention.
Figure 3:
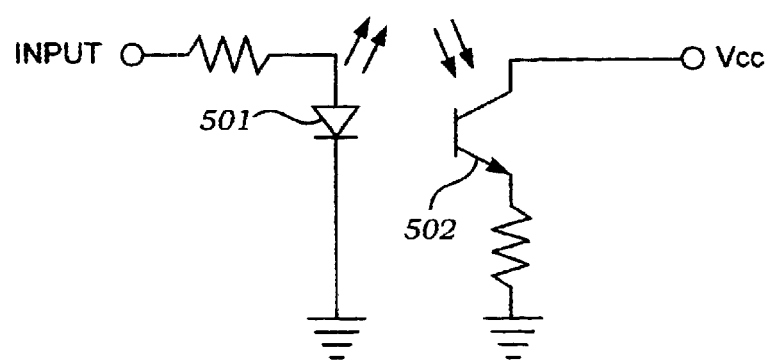

Referring now to FIG. 3, there is shown a sensor which is representative of the sensor used in the illustrative scanner 10. This type of sensor is fairly conventional in the art. The machine utilizes a grouping of eight infrared reflective sensors. One sensor is used as a page detect sensor. The other seven sensors are used to detect marks on the form 100. In particular, the page detect sensor detects a return signal (or not). However, the scanner utilizes the other seven (7) infrared light emitting diodes (LED) with reflective, convergent lenses to sense the absence or presence of pencil marks. The light emitted from each diode 501 is directed at an appropriate angle toward the form 100 and reflected back to the sensor 502.

The LED 501 emits infrared light which is absorbed by the carbon content in graphite lead pencils. The amount of light reflected back to the collector plate of the sensor 502 is inversely related to the intensity of the pencil mark 521 absorbing the reflected light, i.e. the darker the pencil mark, the lower the light intensity reflected to the sensor. The reflected light collected by the sensor 502 creates an output voltage which can be measured. The voltage level is determined by the amount of light reflected and, therefore, can be used to represent the intensity of pencil marks.

The first sensor in the array is used to sense timing marks 101 on the form 100. The remaining six sensors in the array are used to sense the absence or presence of pencil marks in the other columns (on the form 100). When a timing mark 101 is detected, the remaining six sensors in the array are switched on to "read" the form 100.

After the timing mark 101 has passed under the first sensor and is no longer detected, the digital values of the remaining sensors are analyzed to determine the intensity of pencil marks on the form 100 in a conventional manner.

Thus, there is shown and described a unique design and concept of a form utilized with a mark read scanner. The particular configuration of the form uses groupings of quadruple or four level graphic switches thereon. While this description is directed to a particular embodiment, it is understood that those skilled in the art may conceive modifications and/or variations to the specific embodiments shown and described herein. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

What is claimed is:

1. A data processing form for use with photo-sensing apparatus that senses the presence of indicia in indicia-receiving locations on the form, said form comprising, a sheet of material, a control mark column containing a plurality of first control marks disposed parallel to one edge of said sheet, a plurality of indicia-receiving locations having a specific relation to said plurality of first control marks on said sheet, and a control mark row on said sheet containing a plurality of second control marks, said control mark row aligned with at least one of said first control marks in said control mark column and perpendicular to the one edge of said sheet, each of said second control marks selectively exhibits one of four separate and distinct characteristics whereby said form is identifiable by said photo-sensing apparatus to determine a type of form being scanned and an operation to be performed by said apparatus, said four separate and distinct characteristics are defined as a white mark and three different configurations of a black mark.

2. A form recited in claim 1 including, a second control mark column containing a plurality of first control marks on a second surface of said sheet, and a plurality of indicia-receiving locations in specified relation to said first control marks of said second control mark column on a second surface of said sheet.

3. The form recited in claim 1 including, a skew control mark on said sheet aligned with and spaced apart from one of said control marks in order to detect the orientation of said sheet.

4. The form recited in claim 1 wherein, said control mark row is aligned with the first one of said first control marks in said control mark column.

5. The form recited in claim 1 including, a leader block on said sheet to signify that said sheet includes control marks having the specified number of separate and distinct characteristics.

6. The form recited in claim 5 wherein, said leader block extends across a substantial portion of the sheet perpendicular to said one edge thereof.

7. The form recited in claim 1 including, a timing mark aligned with said control mark row to initiate sensing of said second control marks.

8. The form recited in claim 1 including, a leader block on said sheet to signify that said sheet includes control marks having the specified number of separate and distinct characteristics.

9. The form recited in claim 1 wherein, said three different configurations of a black mark comprise a mark with an upper black portion, a mark with a lower black position, and a mark with both upper and lower black portions.

10. The form recited in claim 1 wherein, said control marks comprise arrangements of black and white sections which are arranged to be scanned selectively as white and white sections, black and white sections, white and black sections or black and black sections as determined by the type of form to be processed.

11. Apparatus for scoring a test sheet of a type having plural indicia receiving spaces associated with answer options to a multiple choice question, mode indicating indicia each having at least four distinct detectable characteristics for identifying the type of test sheet provided and a type of operation to be performed by said apparatus, and answer control marks row aligned with said receiving spaces and said mode indicating indicia, comprising, detector means for concurrently sensing an answer control mark and any answer space row or mode indicating indicia aligned therewith and for entering binary data corresponding to said receiving spaces and four level data corresponding to said indicating indicia into a shift register, said detector means operative to sense indicia in said answer spaces having at least two separate gray scale characteristics and in said mode indicating indicia having at least four separate characteristics, drive means for transporting said test sheet past said detector means, and answer comparator means for serially comparing said binary data and said stored answer data for each question and for providing an increment score signal indicative of a correct answer to that question when said binary data and answer data match based upon the gray scale characteristics of said mode indicating indicia.

12. A test sheet according to claim 11 wherein, each answer row contains a plurality of answer receiving spaces designated to correspond to selectable answers of a multiple-choice question.

13. A test sheet according to claim 11 wherein, at least one of said mode indicating indicia designates that the sheet is a master containing correct answers to be entered into said scoring apparatus, and at least one of said indicia designates the answer format of said sheet.

14. A scannable form for use in an optical mark reading system with optical sensing means of a type wherein sensing a presence or absence of response marks placed by a respondent in predetermined response areas on the form is triggered by sensing of a sequence of scan control marks associated with the predetermined response areas, comprising, a generally rectangular sheet of material, at least one column comprising a plurality of spaced apart scan control marks located on said sheet and oriented substantially parallel with an edge of said rectangular sheet, at least one response area comprising a plurality of response bubbles on said sheet associated with one of said scan control marks, and a plurality of graphic switches located on said sheet, said graphic switches arranged to be aligned with one of said scan control marks in said column, said graphic switches comprise optically scannable areas on said sheet of material that represent encoded data information that is determined prior to a respondent using said scannable form whereby said graphic switches will be scanned and decoded by the optical mark reading system to identify the type of scannable form being used and an operation of the optical mark reading system during the scanning of said sheet of material, each of said graphic switches is comprises of a four level coded mark having four distinct characteristics.

15. The form recited in claim 14 wherein, said sheet of material is made of paper.

16. The form recited in claim 14 wherein, said four distinct characteristics are defined as white and three different areas of black.

* * * * *